United States Patent
Wagner et al.

(10) Patent No.: US 12,250,421 B2
(45) Date of Patent: Mar. 11, 2025

(54) DEVICE SYNCHRONIZATION FOR AUDIOVISUAL CONTENT

(71) Applicant: Comcast Cable Communications, LLC, Philadelphia, PA (US)

(72) Inventors: Zachary Wagner, Philadelphia, PA (US); Tony Nguyen, Philadelphia, PA (US); Yong Ji, Springfield, PA (US); Alison Stiel, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 34 days.

(21) Appl. No.: 16/676,593

(22) Filed: Nov. 7, 2019

(65) Prior Publication Data

US 2021/0144422 A1    May 13, 2021

(51) Int. Cl.
*H04N 21/242* (2011.01)
*H04N 21/235* (2011.01)
*H05B 47/155* (2020.01)

(52) U.S. Cl.
CPC ......... *H04N 21/242* (2013.01); *H04N 21/235* (2013.01); *H05B 47/155* (2020.01)

(58) Field of Classification Search
CPC .. H04N 21/235; H04N 21/242; H04N 21/233; H04N 21/4131; H04N 21/43079; H04N 21/8547
See application file for complete search history.

(56) References Cited

U.S. PATENT DOCUMENTS

| | | | |
|---|---|---|---|
| 10,771,835 B1* | 9/2020 | Chong | H04N 21/43615 |
| 2005/0275626 A1* | 12/2005 | Mueller | H05B 47/19<br>345/156 |
| 2007/0169115 A1* | 7/2007 | Ko | H04L 12/2838<br>717/174 |
| 2008/0080568 A1* | 4/2008 | Hughes | H04L 65/80<br>370/519 |
| 2010/0080532 A1* | 4/2010 | Ubillos | G10H 1/0008<br>386/241 |
| 2012/0047542 A1* | 2/2012 | Lewis | H04N 21/44016<br>725/97 |
| 2014/0118541 A1* | 5/2014 | Lasko | G08B 13/19682<br>348/143 |
| 2014/0189052 A1* | 7/2014 | Gholmieh | H04N 21/2408<br>709/217 |

(Continued)

OTHER PUBLICATIONS

Vitruk, Max. "How to Process Live Video Stream Using FFMPEG and OpenCV", Lemberg.com website, Oct. 26, 2017 [retrieved on Nov. 21, 2020]. Retrieved from the Internet: <URL: https://lembergsolutions.com/blog/how-process-live-video-stream-using-ffmpeg-and-opencv>. (Year: 2017).*

(Continued)

*Primary Examiner* — Jason D Recek
(74) *Attorney, Agent, or Firm* — Banner & Witcoff, Ltd.

(57) ABSTRACT

Systems, apparatuses, and methods are described for synchronizing output of a plurality of user devices. An immersive experience for users may be provided by mapping what the users are watching into functionalities of the user devices. Manifest files may comprise information determined for audio and/or video features of segments of audiovisual content. The manifest files may be used by secondary user devices to output visual effects in synchronization with output of audiovisual content by a primary user device.

24 Claims, 7 Drawing Sheets

(56) References Cited

U.S. PATENT DOCUMENTS

| | | | | |
|---|---|---|---|---|
| 2014/0229829 | A1* | 8/2014 | Mazur | G06F 3/165 |
| | | | | 715/716 |
| 2016/0338180 | A1* | 11/2016 | Archdale | G02B 27/0172 |
| 2017/0034263 | A1* | 2/2017 | Archambault | H04L 67/1095 |
| 2017/0262253 | A1* | 9/2017 | Silva | G09G 5/12 |
| 2018/0063217 | A1* | 3/2018 | Barkley | H04N 21/8456 |
| 2018/0131971 | A1* | 5/2018 | Hwang | H04N 21/2362 |
| 2018/0152499 | A1* | 5/2018 | Oyman | H04L 65/604 |
| 2018/0277112 | A1* | 9/2018 | Kim | G10L 15/22 |
| 2018/0310032 | A1* | 10/2018 | Reitmeyer | H04N 21/440218 |
| 2019/0104593 | A1* | 4/2019 | Aliakseyeu | G06F 16/785 |
| 2019/0174610 | A1* | 6/2019 | Den Hartog | G10L 25/51 |
| 2019/0191246 | A1* | 6/2019 | Born | H04R 5/033 |
| 2019/0228253 | A1* | 7/2019 | Ramaswamy | H04N 19/98 |
| 2019/0268393 | A1* | 8/2019 | Panagos | H04L 65/607 |
| 2019/0349213 | A1* | 11/2019 | Shive | G05B 15/02 |
| 2020/0137347 | A1* | 4/2020 | Rechner | H04N 17/00 |
| 2020/0275152 | A1* | 8/2020 | Rycroft | H04N 21/44008 |
| 2020/0382742 | A1* | 12/2020 | Guillotel | A63F 13/537 |

OTHER PUBLICATIONS

Kastrenakes, Jacob "Philips Hue box makes smart lights flash along with anything on your TV," The Verge, https://www.theverge.com/2019/9/17/20864953/tv-light-sync-box-philps-hue-play-hdmi-passthrough-4k, Sep. 17, 2019.

Set-top box, retreived from https://web.archive.org/web/20191003194818/https://en.wikipedia.org/wiki/Set-top_box, dated Oct. 3, 2019.

Internet Protocol television, retrieved from https://web.archive.org/web/20191013100456/https://en.wikipedia.org/wiki/Internet_Protocol_television, dated Oct. 13, 2019.

Message queue, retrieved from https://web.archive.org/web/20190809172433/https://en.wikipedia.org/wiki/Message_queue, dated Aug. 9, 2019.

ROS Answers, "What is the Difference between a topic and a message?", retrieved from https://web.archive.org/web/20180125082109/https://answers.ros.org/question/63511/what-is-the-difference-between-a-topic-and-a-message/, dated Jan. 25, 2018.

Manifest file, retrieved from https://web.archive.org/web/20190812193932/https://en.wikipedia.org/wiki/Manifest_file, dated Aug. 12, 2019.

Beat detection, retrieved from https://web.archive.org/web/20190803222826/https://en.wikipedia.org/wiki/Beat_detection, dated Aug. 3, 2019.

TarsosDSP, Github.com, retrieved from https://web.archive.org/web/20171221224643/https://github.com/JorenSix/TarsosDSP, dated Dec. 21, 2017.

Lovisa Johansson, "What is message queueing?", https://www.cloudamqp.com/blog/2014-12-03-what-is-message-queuing.html, last updated Sep. 25, 2019.

* cited by examiner

DEVICE SYNCHRONIZATION FOR AUDIOVISUAL CONTENT

BACKGROUND

Internet of Things (IoT) devices may wirelessly communicate with other related devices in a smart home environment to control lighting and/or other systems. Home entertainment systems may comprise smart TVs, smart displays, smart speakers, modems, set top boxes, gateways, wireless routers, or other electronic devices. However, current home entertainment systems may fail to efficiently operate in concert with other devices to provide synchronized output.

SUMMARY

The following summary presents a simplified summary of certain features. The summary is not an extensive overview and is not intended to identify key or critical elements.

Systems, apparatuses, and methods are described for providing an immersive experience for users by controlling user devices to provide synchronized output of audiovisual content and visual effects. The user devices may comprise one or more primary user devices such as, for example, smart TVs, Internet Protocol Televisions (IPTVs), High Definition Televisions (HDTVs), laptop and/or tablet computers, smart phones, etc. The user devices may comprise one or more secondary user devices such as, for example, smart light bulbs, IoT devices with lighting control, smart displays, etc. A segment of content may be received from one or more content providers. Audio and/or video components of the content segment may be analyzed to determine audio features and/or video features. Based on the determined audio and/or video features, a manifest file indicating one or more of those features, and/or time values associated with one or more of those features, may be generated. The manifest file may be adjusted based on network delay and/or adjusted based on user preferences. The manifest file may be sent to one or more secondary user devices that may output, based on the manifest file and in synchronization with the output by one or more primary user devices of audio and/or video components of the segment, one or more visual effects. For example, one or more of the secondary user devices may pulse colored light in time with distinct audio points, such as acoustical strokes, accents, tempos and/or audio beats in the audio components, associated with an audio track of content being played by a primary user device. These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
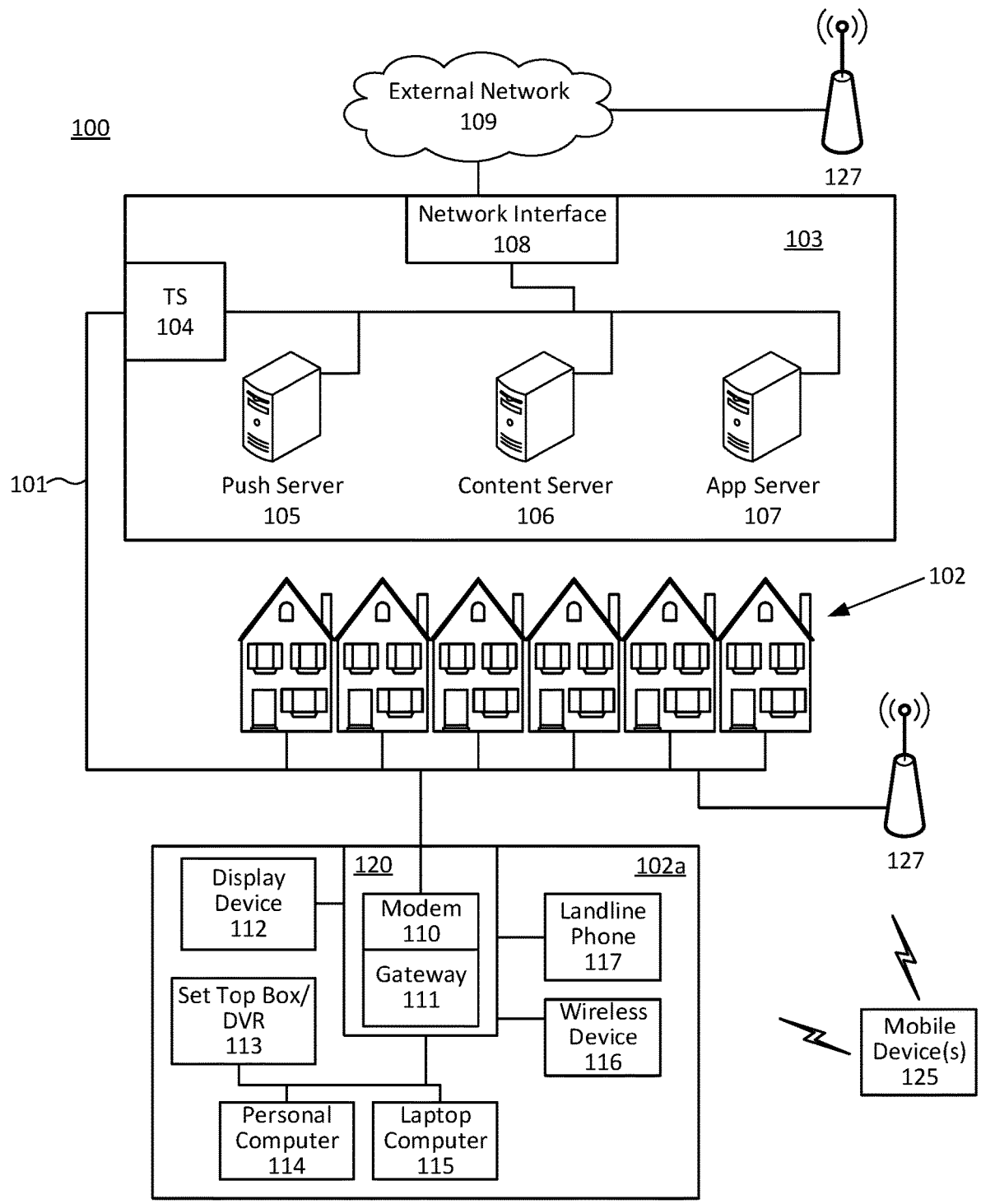
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not shown, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, for example, via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106

(or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The servers 105, 106, 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, for example, display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use assets. An asset may comprise a video, a game, one or more images, software, audio, text, webpage(s), and/or other content.

Figure 2:
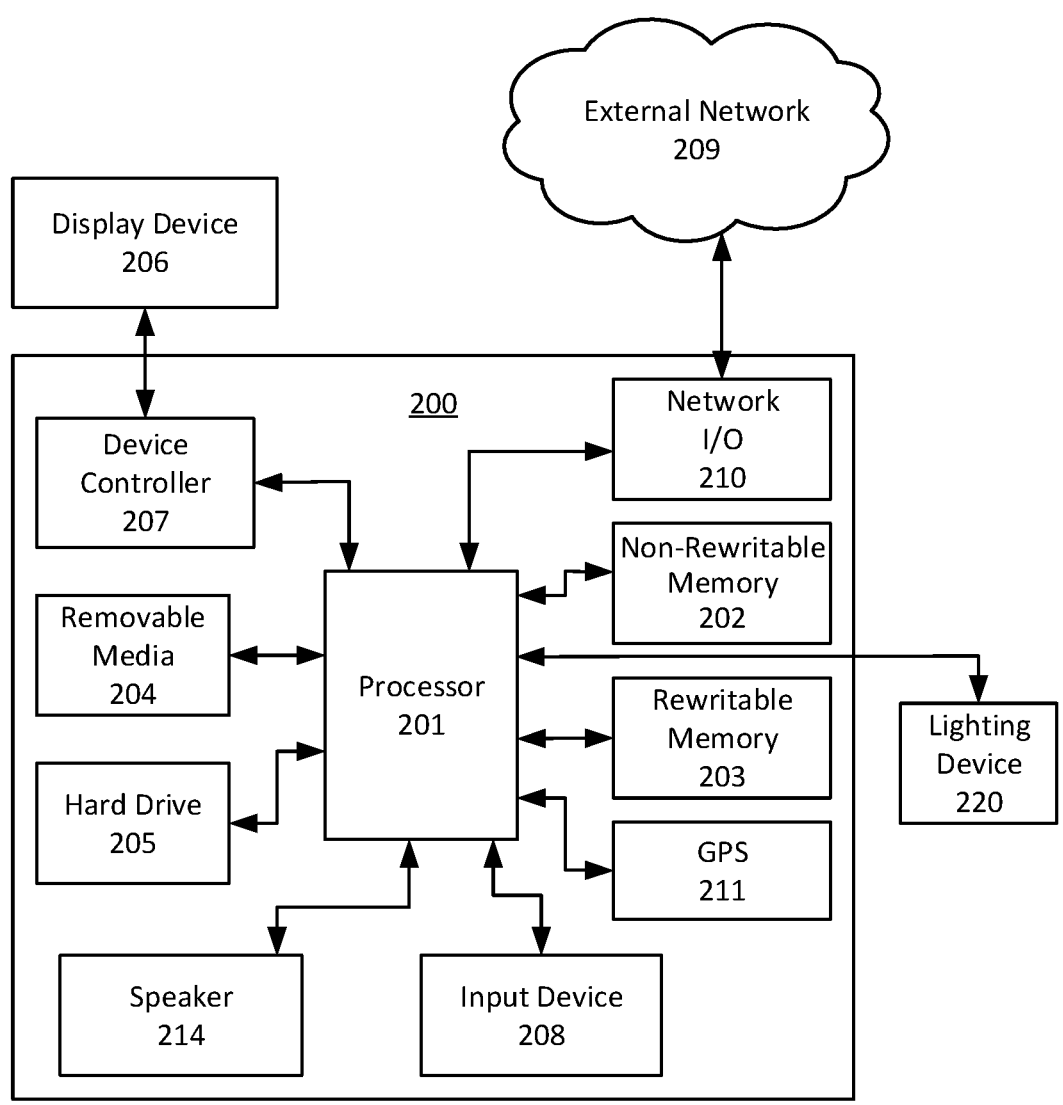
FIG. 2 shows hardware elements of a computing device.

FIG. 2 shows hardware elements of a computing device 200 that may be used to implement any of the computing devices shown in FIG. 1 (e.g., the mobile devices 125, any of the devices shown in the premises 102a, any of the devices shown in the local office 103, any of the wireless access points 127, any devices with the external network 109) and any other computing devices discussed herein (e.g., home entertainment controllers, network managers, audiovisual data processors, primary user devices, secondary user devices). The computing device 200 may comprise one or more processors 201, which may execute instructions of a computer program to perform any of the functions described herein. The instructions may be stored in a non-rewritable memory 202 such as a read-only memory (ROM), a rewritable memory 203 such as random access memory (RAM) and/or flash memory, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor or a controller for an infra-red or BLUETOOTH transceiver. One or more user input devices 208 may comprise a remote control, a keyboard, a mouse, a touch screen (which may be integrated with the display device 206), a microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

The computing device 200 may comprise and/or communicate with a lighting device 220, as shown in FIG. 2. The lighting device 220 may comprise one or more Light-Emitting Diodes (LEDs), one or more Liquid-Crystal Displays (LCDs), and/or one or more other types of lighting devices. The computing device 200, with the lighting device 220, may comprise a smart light bulb, a smart lighting system, an automotive lighting system, and/or another type of lighting system. The lighting device 220 may be controlled by the one or more processors 201 or one or more other components in the computing device 200. For example, the lighting device 220 may receive, from the one or more processors 201, digital values representing color codes. The digital values may be obtained (e.g., by the at least one processor 201) from or based on manifest files. The lighting device 220 may output, based on the digital values, colored light and/or visual effects associated with content. The lighting device 220 may comprise various digital circuitry, such as amplifiers, power source/converters, processors, network interfaces, etc., to communicate with the one or more processors 201 or one or more other components of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
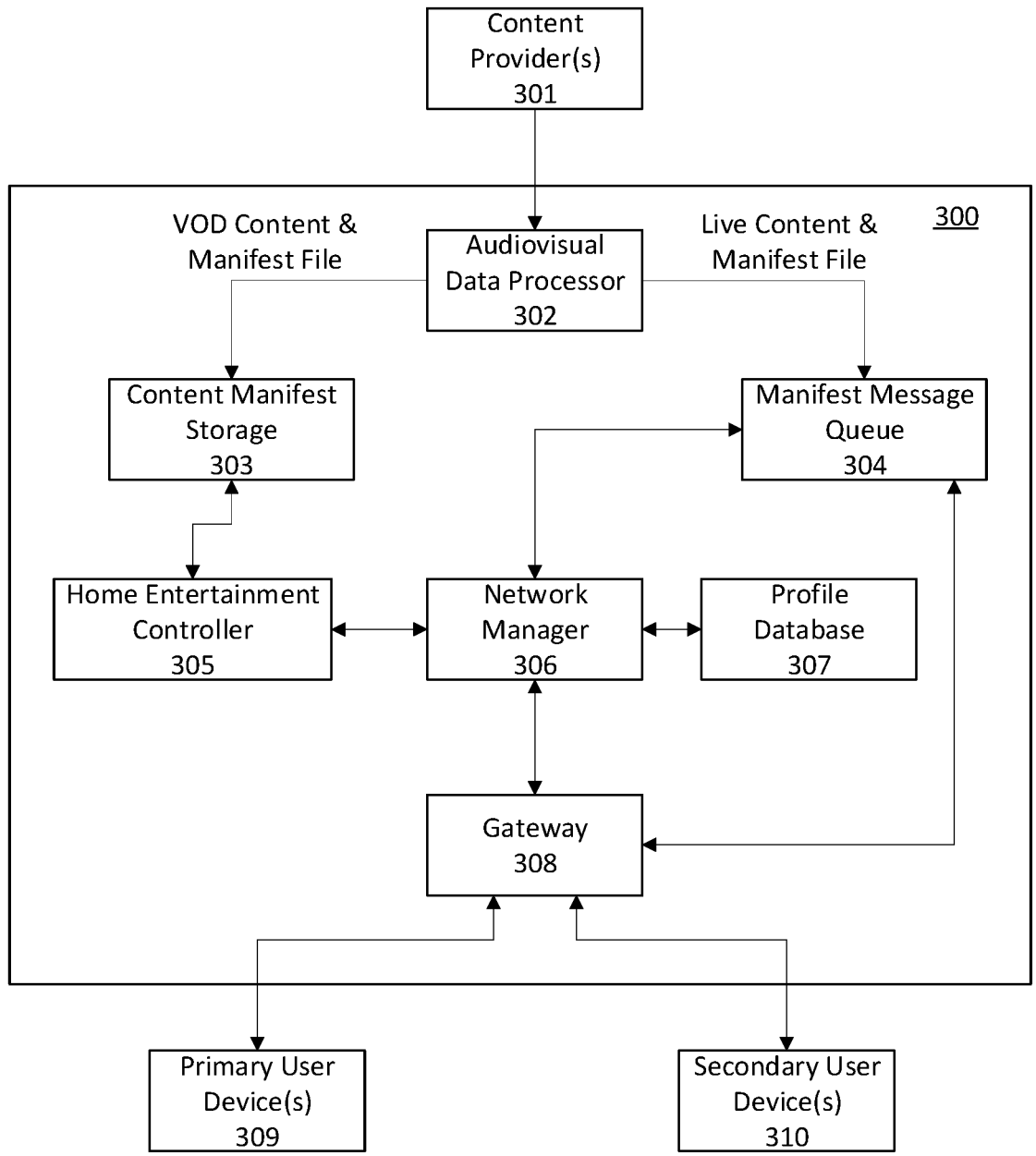
FIG. 3 shows an example configuration of a home entertainment system.

FIG. 3 shows an example configuration of a home entertainment system 300. An audiovisual data processor 302 in the system 300 may receive a segment of content from a content provider 301. The content segment may comprise, for example, text materials, photographs or other still images, audio files, video files, Graphic Interchange Format files (GIFs) and/or other types of animation, interactive applications (and/or portions thereof), and/or other types of content. The content segment may also or alternatively comprise discrete portions of a content item such as a video on demand (VOD) content item, a linear video content item, a live content item, a web streaming content item, a video conferencing content item, etc. The content segment may be displayed or otherwise presented to users via one or more primary user devices 309 comprising, for example, the display device 112 (e.g., a smart TV, a smart display, an HDTV, etc.), the personal computer 114, the laptop computer 115, the mobile devices 125, etc. One or more secondary user devices 310 may comprise a variety of lighting or display devices (e.g., smart light bulbs, internet-capable lighting devices, Light-emitting Diode (LED) display panels, etc.) and/or other IoT products with lighting and/or other display features. If a user command is received by the system 300 to turn on an output synchronization feature of the system 300, the user devices may be controlled to output the content segment (e.g., by causing display of video and/or audio components of the content segment via the primary user device(s) 309) in synchronization with output of supplemental lighting and/or other lighting and/or visual effects (e.g., by controlling lighting element(s) of the secondary user device(s) 310).

Each component of the system 300 and other devices (e.g., one or more computing devices of the content provider 301, the primary user device(s) 309 and the secondary user device(s) 310) may comprise a local clock. These local clocks may be synchronized via a centralized clock for a home entertainment cloud (e.g., the home entertainment system 300). These local clocks may be synchronized using, for example, one or more of Network Time Protocol (NTP), Simple Network Time Protocol (SNTP) or Precision Time Protocol (PTP). NTP may be designed to synchronize the local clocks across the Internet or Local Area Networks (LANs) and provide accurate and synchronized time for each component of the system 300 and other devices. For example, all network components or devices of a home entertainment cloud may connect to a main server (e.g., a home entertainment controller 305). This main server may call to another server, such as a public time server (e.g., in external network 109 or external network 209) to keep track of Coordinated Universal Time (UTC) via the Internet. Through mechanisms such as NTP, SNTP or PTP, each component of the system 300 or other devices may maintain accurate current time, calibrated to fractions of a second. Such precision may enable network components, devices and/or applications to communicate with each other effectively. For example, the system 300 and the user devices (e.g., the primary user device(s) 309 and the secondary user device(s) 310) may keep communicating with one another to maintain accurate current time via the Internet and/or one or more LANs. The synchronized local clocks in the system 300, the primary user device(s) 309, and/or the secondary user device(s) 310 may facilitate adjusting for differences of times for receipt and/or processing of content segments and manifest files.

The user devices may output audio and/or video components of a content segment and may also output other visual effects. The output of the visual effects may be synchronized with the output of the content segment based on one or more manifest files. A manifest file may comprise feature data that indicates one or more features associated with the content segment, as well as time stamps corresponding to those features (e.g., time stamps indicating a time in the content segment during which a feature occurs). The time stamps may be determined and/or adjusted based on local clocks associated with the system 300, the primary user device(s) 309 and/or the secondary user device(s) 310. The time stamps may be used to keep track of a sequence of events associated with the content segment, the manifest file, the primary user device(s) 309, the secondary user device(s) 310, etc. The time stamps may be used to generate and/or process a file (e.g., manifest file), a log, or a notification that records an event in which data is added, removed, modified or transmitted. The time stamps may indicate current time of a recorded event. The time stamps may be used to record current time in relation to a starting point (e.g., if a user command to synchronize output by the user devices is received) or an end point (e.g., if a user command to stop synchronizing the output by the user devices is received). The controller 305, a network manager 306 and/or a gateway 308 may be configured to adjust the time stamps to offset based on an expected network delay caused by transmission and/or processing of various network communications, such as, for example, sending or receiving digital signals, user identification, user commands, manifest files, etc.

The audiovisual data processor 302 may process a content segment, received from the content provider 301, to determine audio and video components of the content segment. A plurality of time stamps may be associated with those audio and/or video components. The audiovisual data processor 302 may analyze the audio component to determine audio features (e.g., beats) using beat detection algorithms, computer software or computer hardware (to be described below). Based on the audio beats, the secondary user device(s) 310 may change, for example, color or other visual features associated with the content segment at a plurality of times of audio beats. The audiovisual data processor 302 may extract the video component comprising a plurality of frames comprising color or visual features (Red-Green-Blue (RGB), Hue-Saturation-Brightness (HSB), Cyan-Magenta-Yellow-Key (CMYK) colors, etc.) along with a plurality of time stamps. One or more frames associated with the times of audio beats may be sampled by the audiovisual data processor 302. The sampled frames may be analyzed to determine video features associated with those frames (e.g., average color). A manifest file may be generated and may comprise data indicating one or more of those video features and corresponding time stamps. The manifest file, which may be modified by the gateway 308 prior to transmission to the secondary user device(s) 310, may be used by the secondary user device(s) 310 to determine when and/or how to provide output of visual effects based on the visual features (e.g., by activating and/or deactivating a light source, by controlling a color of the light source, etc.) associated with the content segment, for example, at the times of audio beats. The time stamps may be adjusted by a network administrator or network carriers.

The audiovisual data processor 302, using one or more beat detection algorithms implemented using computer software (e.g., TarsosDSP, a Java library for audio processing), firmware and/or hardware, may be used to determine, for the audio component of a content segment, primary frequencies and/or audio beats. TarsosDSP and/or other audio analysis software, firmware, and/or hardware may provide an interface to an audio beat processing algorithm implemented in Java and without any other external dependencies. The audio component may comprise a plurality of audio files (e.g., waveform audio (.wav) files, MPEG-1 audio layer 3 (.mp3) files, Windows Media audio (.wma) files, etc.). Based on TarsosDSP (and/or other software, firmware, and/or hardware), audio beats (e.g., impulses of sound occurring at regular or irregular intervals) may be detected from the audio component by detecting impulses of sound in the audio component and determining time stamps at which these impulses appear during playback of the content segment. Indications of the audio beats may be included in a manifest file to control the secondary user device(s) 310, which may turn a lighting device on or off (or otherwise control a lighting device) at occurrences of the audio beats associated with the audio component. Also, indications of other distinct audio points, such as acoustical strokes, accents, and/or tempos in the audio component, may be included in the manifest file. For example, the secondary user device(s) 310 may pulse a lighting device to fast tempo or slow tempo music associated with the content segment. Based on the manifest file comprising the time stamps, the secondary user device(s) 310 may pulse colored light in time with distinct audio points in the audio component. The audio beats (or other distinct audio points) may occur in time with changes of color or color intensity of the secondary user device(s) 310 or turning on or off the secondary user device(s) 310.

The controller 305 may receive a user request to deliver content comprising the content segment to the primary user device(s) 309 (e.g., smart TVs, smart displays, HDTVs etc.), via the gateway 308 and the network manager 306. The controller 305 may also receive a request to synchronize output by the user devices (e.g., the primary user device(s) 309 and the secondary user device(s) 310) of the content segment and additional visual effects. The controller 305 may comprise, for example, an IP set-top box (or other computing device) which provides two way communications on an IP network, decodes video streaming media (e.g., VOD content, web-streaming content, live streaming content, etc.), and/or enables the user devices to link to an IP network. The controller 305 may also comprise the one or more processors 201 of FIG. 2. The controller 305 may alert the network manager 306 of a user command to pause and/or unpause output of content that comprises the content segment. The network manager 306 may alert the gateway 308 to pause or unpause output of that content. If playback of that content segment is paused and unpaused, the gateway 308 (and/or one or more other computing devices in the system 300) may adjust a manifest file associated with the content segment to proceed from times of pausing/unpausing. The adjusted manifest file may be sent from the gateway 308 to the secondary user device(s) 310. Each of the various functional components in the system 300 (e.g., the controller 305, the network manager 306, the gateway 308, etc.) may comprise a computing device 200, which may be configured (e.g., based on stored executable instructions) to provide one or more functions to facilitate synchronized output, by the user devices, of the content segment and additional visual effects. One or more of the components of the system 300 may be combined in a single computing device, and/or may comprise multiple computing devices. Some or all of the computing device(s) implementing the functional components of the system 300 may be co-located with the primary user device(s) 309 and/or the secondary user device(s) 310 (e.g., in a premises 102). Some or all of the computing device(s) implementing the functional components of the system 300 may be located remotely from the primary user device(s) 309 and/or the secondary user device(s) 310 (e.g., in one or more local offices 103 and/or other locations).

The network manager 306 may manage and/or connect to various functional components in the system 300. The network manager 306 may comprise, for example, a WiFi network router (e.g., wireless access points 127) which manages the system's WiFi network and connected home environment. For example, the network manager 306 may retrieve from the profile database 307 user personalization data such as, for example, user identifications, user account information, user locations, user favorites, user comments, user login credentials, user preferred genres, user lighting or color preferences, user specific themes, user commercials/sponsor themes, user pause/unpause settings, user customized room atmospheres, etc. The user personalization data may be used to modify and/or process a manifest file associated with the segment. For example, users may choose to increase color intensity associated with the secondary user device(s) 310 to represent suspenseful crime scenes that the users are watching on the primary user device(s) 309. A user may configure a user profile, stored in the profile database 307, to indicate that one or more color code values may be added to (or removed from) a manifest file. A user may choose to tone down colors output by the secondary user device(s) 310 when the users are watching educational TV programs with their children. Indications of various color characteristics (e.g., hue, saturation, brightness, etc.) and other visual parameters may be included in a manifest file associated with a content segment, via the user personalization data stored by the profile database 307. The network manager 306 may deliver the content segment and/or its manifest file to the gateway 308.

The gateway 308 may send content segments to the primary user device(s) 309 and may send manifest files to the secondary user device(s) 310. Communications from the gateway 308 to the user devices, as well as communications from the user devices to the gateway 308, may comprise other signals, instructions, messages, etc. The gateway 308 may support an agent or software that determines an expected network delay(s) between itself and each of the primary user device(s) 309 and/or the secondary user device(s) 310 and may record the expected network delay in a latency table. For example, the gateway 308 may cause the agent or software to ping the primary user device(s) 309 and the secondary user device(s) 310 and determine data trip times. The gateway 308 may cause the agent or software to check current path latency, view a list of components, routers or devices along the path, and/or record measurements for total latency by Time to First Byte (TTBF) or Round Trip Time (RTT) in the latency table. The latency table may be used to offset or otherwise adjust a plurality of time stamps in the manifest files. The latency table may be adjusted based on a sum of the expected network delay, for example, from the primary user device(s) 309 to the controller 305 and from the controller 305 to the secondary user device(s) 310 (to be described later). Network delays caused by processing and/or communications delays associated with other network components (e.g., Ethernet hubs, switches, bridges, routers, gateways, wireless access points, modems, etc.) in the system 300 may be considered when the latency table is generated and/or updated. The gateway 308 may read and/or adjust one or more manifest files in view of network delays between the user devices and the home entertainment system 300.

A manifest file may also include or otherwise indicate metadata, for example, genre and commercial or sponsor themes, for content. The manifest file may include data that configures display of commercial-related colors or themes during playback of a commercial to enhance an advertising effect. For example, a commercial for a professional sports team may comprise images that display team colors. A manifest file may include codes that cause the secondary user device(s) to output similar colors in synchronization with the images of the commercial. For example, to create such an effect for a team color that comprises midnight green, the following color code may be used—Pantone Matching System (PANTONE) 316 C; Hexadecimal (HEX) #004C54; RGB (0, 76, 84); or CMYK (100, 0, 30, 70). Also, a manifest file may include a color from a designated set of color codes, based on an instruction from the content providers 301. For example, the content providers 301 may cause the manifest file to include a color of with one team (e.g., midnight green) and not to include a color of an opposing team (e.g., blue) during a sports game or its commercial. The instruction from the content providers 301 may comprise a limited palette of colors that the manifest file may choose from. Other color codes and/or codes for optical, graphic, and/or special effects may be added to the manifest file by the network administrator or commercial sponsors to enhance efficacy of their advertisements. Such enhancement is not limited to commercial or sponsor themes, but may be applied to movies, live broadcasts, web conferencing, video clips, etc. The adjusted manifest file may be sent to each of the secondary user device(s) 310 to cause output of visual effects.

The system 300 and the user devices (e.g., the primary user device(s) 309 and the secondary user device(s) 310) may experience network delay during synchronization with a content comprising a content segment. This network delay may range from just a few milliseconds to several hundred milliseconds. The network delay may comprise, for example, time for a bit (or other quantity) of data (e.g., electrical or optical signals, manifest files, time stamps, user commands, user profile or preferences, etc.) to travel across the system 300 or between the system 300 and the user devices. Example sources of network delays may comprise, for example, processing delay, transmission delay, propagation delay, etc.

For example, network delays may be caused during synchronization of the user devices for output of a content segment and additional visual effects. On Tuesday at 9:00 pm, a user may be watching a movie (e.g., a VOD movie) on the primary user device(s) 309 and push a remote control input that indicates the user wants the secondary user device(s) 310 to provide output to enhance viewing of the movie via the primary user device(s) 309. A first delay may be caused by a user command, for example, traveling from the primary user device(s) 309 to the controller 305, via the gateway 308 and the network manager 306. A second delay may be caused by a manifest file associated with a segment of the movie, for example, traveling from the content manifest storage 303 to the gateway 308, via the controller 305 and the network manager 306. A third example delay may be caused by a traveling time, for example, between the gateway 308 and each of the secondary user device(s) 310. These delays may be determined or added by the gateway 308 or any other component in the system 300.

Based on a sum of network delays or any other delays (e.g., processing, transmission and propagation delays), a plurality of time stamps in the manifest file may be adjusted. For example, a net time delay may be 400 milliseconds, measured and/or otherwise determined by the gateway 308. The net time delay may represent, for example, a time difference between (i) a time that the primary user device(s) 309 receive (and/or begin to process) a content segment sent by the gateway 308 and (ii) a time that the secondary user device(s) 310 receive (and/or begin to process) a manifest file corresponding to that content segment. The net time delay may be recorded in a latency table stored by the gateway 308 and/or any other component in the system 300. The time stamps may be adjusted to compensate for the net time delay (e.g., offset times). For example, net time delay (e.g., 400 milliseconds) may be subtracted from the time stamps to compensate for those net time delay. This subtraction of the net time delay from the time stamps may enable the secondary user device(s) 310 to synchronize output of additional visual effects with output by the primary user device(s) 309 of audio and/or visual components of a content segment. For example, the secondary user device(s) 310 may output colored light (and/or other effects) for video features, indicated by a manifest file, at or near the time that the primary user device(s) 309 display video frame(s) and/or beat(s) from which those video features were determined. Other time-offsetting schemes may be used to optimize the time stamps within the manifest file. The time stamps may be adjusted based on the latency table managed by the gateway 308. The adjusted manifest file may be sent to each of the secondary user device(s) 310. If the adjusted manifest file is executed, a user may enjoy an immersive experience while the secondary user device(s) 310 provide output based on, and synchronized with, video and audio features of the movie that the user is watching.

If a user is watching live content, playback of a segment of the live content may be briefly paused (e.g., less than one second) during a live content synchronization procedure, such as, for example, receiving user instructions from the primary user device(s) 309, processing manifest files within the system 300, sending the manifest files to the secondary user device(s) 310, etc. In this way, the secondary user device(s) 310 may be in sync with the primary user device(s) 309, and the user devices may start displaying synchronized output for the segment. The playback of the segment may be unpaused when the secondary user device(s) 310 are ready to execute a manifest file received from the gateway 308. This brief pause may enable the user devices to prepare for synchronization with the segment without adjusting, for example, a plurality of time stamps within the manifest file. As previously described, if a user instruction to pause and/or unpause playback of content comprising the segment is received, the manifest file may be adjusted based on timings of pausing/unpausing, by the gateway 308 or one or more other computing devices in the system 300. The adjusted manifest file may be sent from the gateway 308 to the secondary user device(s) 310. Also or alternatively, the manifest file may be adjusted based on net time delay as previously described.

Figure 4:
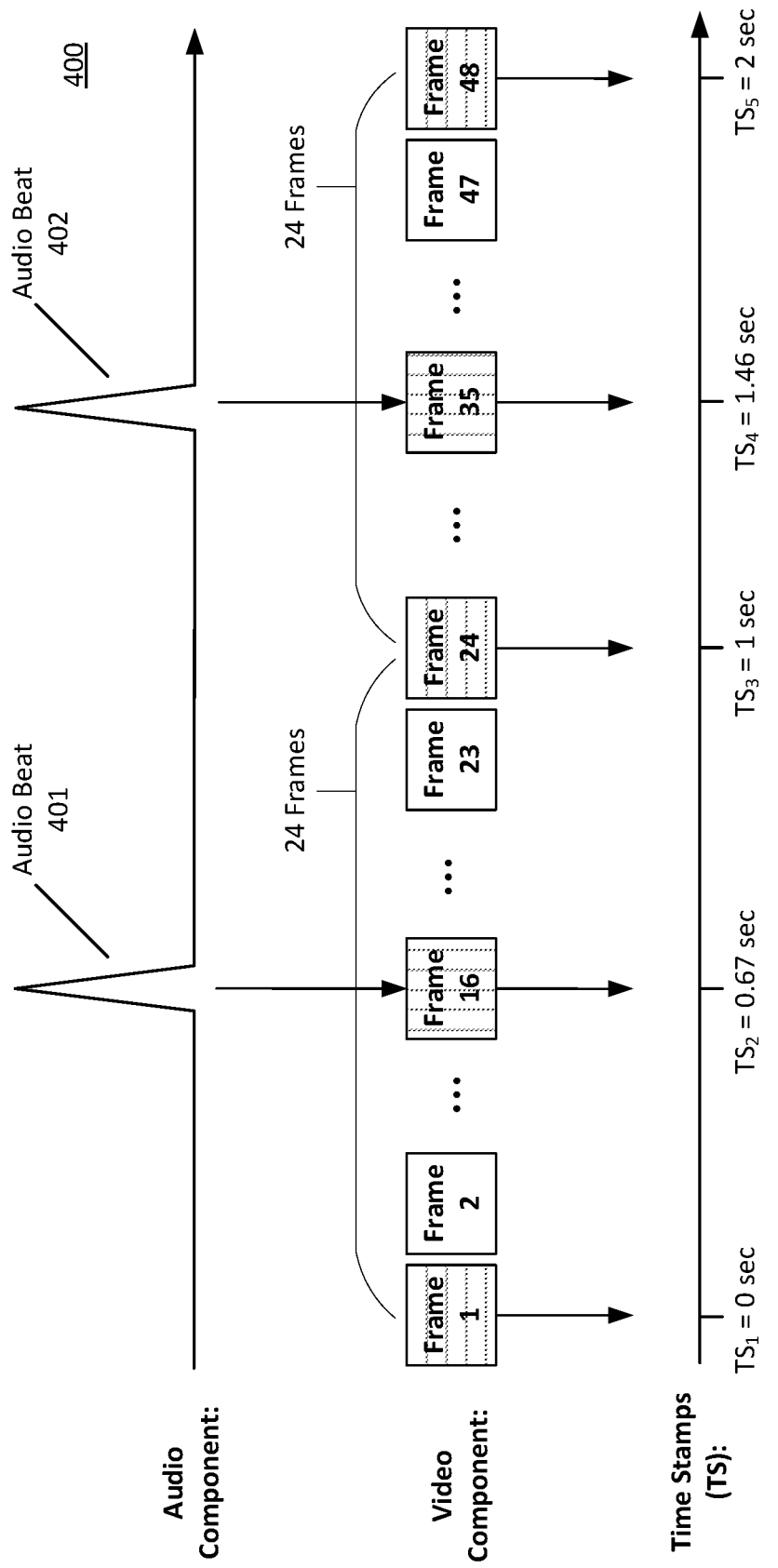
FIG. 4 shows an example timeline for determining a plurality of time stamps associated with a segment of audiovisual content.

FIG. 4 shows an example timeline 400 for determining a plurality of time stamps associated with a content segment. The time stamps may be determined by the audiovisual data processor 302, as previously described in connection with FIG. 3. In FIG. 4, a plurality of audio beats (e.g., audio beats 401 and 402) may be detected from an audio component of the content segment. A plurality of frames (e.g., frames 1 to 48) may be detected from a video component of the content segment. The audio beats and the frames may correspond with a plurality of time stamps (e.g., $TS_1$ to $TS_5$), respectively. The frames (e.g., frames 1, 16, 24, 35 and 48) and their corresponding time stamps (e.g., $TS_1$ to $TS_5$) may be sampled and/or stored by the audiovisual data processor 302, to map audio and/or video features of the content segment into functionalities of the secondary user device(s) 310. The audiovisual data processor 302 may sample or determine, for example, a first group of frames (e.g., frames 16 and 35) associated with times of audio beats of the segment (e.g., audio beats 401 and 402) and a second group of frames (e.g., frames 1, 24 and 48) associated with a regular sampling scheme (e.g., by sampling one frame from each 24 frames of the video component). A combination of these frame groups and/or other frames determined by one or more other sampling schemes may be used to generate a manifest file associated with the segment.

In FIG. 4, the first group of frames 16 and 35 (indicated by vertical line patterns) may be determined based on, for example, a plurality of times of audio beats occurring at time stamps $TS_2$ and $TS_4$. The audio beats 401 and 402 may be determined using an audio beat detection algorithm, for example, TarsosDSP, as previously described. The audio beats 401 and 402 may correspond with the frames 16 and 35, as indicated by a set of arrows between the audio beats 401 and 402 and the frames 16 and 35. The frames 16 and 35 may correspond with the time stamps $TS_2$ (e.g., 0.67 sec) and $TS_4$ (e.g., 1.46 sec), as indicated by a set of arrows between the frames 16 and 35 and the time stamps $TS_2$ and $TS_4$. The time stamps $TS_2$ and $TS_4$, which may be stored by the audiovisual data processor 302, may also correspond with the audio beats 401 and 402.

In FIG. 4, a second group of frames (indicated by horizontal line patterns) may be determined based on a regular sampling scheme (e.g., sampling every 24th frame of the video component of the content segment). The video component may comprise a video frame rate of, for example, 24 frames/sec. The video component may comprise any other frame rates such as, for example, 30 frames/sec or 48 frames/sec. If the video frame rate is 24 frames/sec, one frame per each 24 frames may be sampled (e.g., frames 1, 24 and 48), as shown in FIG. 4. The frames 1, 24 and 48 may correspond with $TS_1$ (e.g., 0 sec), $TS_3$ (e.g., 1 sec), $TS_5$ (e.g., 2 sec), respectively. Different sampling rates may be used to sample a plurality of frames from the video component. The time stamps $TS_1$, $TS_3$ and $TS_5$ may be stored by the audiovisual data processor 302.

A manifest file may be produced based on information determined from analysis of the first group of frames (frames 16 and 35) and/or the second group of frames (frames 1, 24, and 48). The manifest file may be produced based on a first set of times of audio beats associated with the segment (e.g., the time stamps $TS_2$ and $TS_4$ corresponding to the first group of frames) and/or a second set of times associated with the regular sampling scheme (e.g., the time stamps $TS_1$, $TS_3$, and $TS_5$ corresponding to the second group of frames). The manifest file comprising one or more of these times may be stored by the audiovisual data processor 302. In addition to these times, the manifest file may contain corresponding values for colors associated with the times indicated in the manifest file. For example, a manifest file may contain, for times corresponding to beats (e.g., $TS_2$ and $TS_4$), values indicating an average of colors in regularly-sampled frames immediately preceding and immediately following the frame corresponding to a beat. In the example of FIG. 4, the manifest file may contain, as a color value corresponding to $TS_2$, one or more values determined based on averages of colors from the frames 1 and 24, and may further contain, as a color value corresponding to $TS_4$, one or more values determined based on averages of colors from the frames 24 and 48. Color values, corresponding to time values in a manifest file, may also or alternatively be determined in other ways. A manifest file may also or alternatively contain, for each of time stamps (e.g., $TS_1$, $TS_2$, $TS_3$, $TS_4$, or $TS_5$), a value indicating a most dominant color of each frame associated with each of the time stamps. For example, the most prominent color in each frame may be determined by determining a baseline of RGB color values and finding a difference in the RGB color values, for example, by using standard deviation.

The secondary user device(s) 310 receiving a manifest file may determine, based on the time values and corresponding color values in the manifest file, times to output specific colors. Continuing the example from above, the secondary user devices may determine, based on the manifest file, to output at time $TS_2$ a color that is based on averages of colors from the frames 1 and 24, and to output at time $TS_4$ a color that is based on averages of colors from the frames 24 and 48. By outputting those colors based on the times indicated in the manifest file, the output of the secondary user device(s) 310 may be synchronized to output of the content segment by the primary user device(s) 309.

A content segment, analyzed to determine information for inclusion in a manifest file, may, for example, comprise a segment of live content or VOD content. Although VOD and live content are used in examples that follow, the methods described herein may also or alternatively be performed in connection with segments comprising content of other types and/or formats. Live content may comprise, for example, linear content and/or content being streamed in real time or near real time. As also explained below, live content may be processed differently from other content to accommodate rapid delivery of the content via the gateway 308 that is subscribed or registered to the manifest message queue 304. In the example system shown in FIG. 3, for example, it may be advantageous to send live content from the manifest message queue 304 to the gateway 308, instead of sending live content from the manifest message queue 304 to the gateway 308 via the network manager 306. As also explained below, live content may be received via one or more network elements (e.g., the manifest message queue 304) different from elements via which other types of content (e.g. VOD content) are received.

If a content segment is a segment of live content, the content segment and its manifest file may be processed by the audiovisual data processor 302 and may be stored in a manifest message queue 304, as shown in FIG. 3. The manifest message queue 304 may comprise a data structure, for example, a content topic, associated with one or more manifest files. The content topic may comprise a listing or channel of certain types of data (e.g., manifest files) to which one or more devices may subscribe (e.g., via gateway 308). The manifest message queue 304 may publish one or more manifest files that are sent to all subscribing devices. This subscribing function may facilitate distribution of one or more manifest files in real time. As previously described, a user command to synchronize output of the user devices may be received by the controller 305. Based on the user commend, playback of content comprising the content segment may be paused (e.g., less than a second). The controller 305 may send the user command to the network manager 306. The network manager 306 may retrieve an indication of the content topic associated with the live content (or its manifest files) from the manifest message queue 304. The network manager 306 may send an indication of the content topic to the gateway 308. Based on the received indication of the content topic, the gateway 308 may subscribe to the content topic via the manifest message queue 304, and may receive the manifest file from the manifest message queue 304 based on that subscribing. The content segment may be sent to the primary user device(s) 309, the manifest file may be sent to the secondary user device(s) 310, and the playback of the content comprising the content segment may be unpaused.

If a content segment is a segment of VOD content, the content segment and its manifest file may be processed by the audiovisual data processor 303 and stored by the content manifest storage 303. Playback of the VOD content comprising the content segment may be paused during synchronization of the user devices, and network delays may be avoided or minimized. In this case, the playback may be resumed after the secondary user device(s) 310 are ready to execute a manifest file for the VOD segment. Alternatively, if the playback is not paused and continues, a net time delay or offset time (e.g., resulting from network delays) may be measured or calculated by the gateway 308 or one or more other computing devices in the system 300. For example, the gateway 308 may modify or adjust time values in the manifest file (e.g., time stamps in the manifest file) to compensate for the net time delay or offset time, as previously described in connection with FIG. 3. The modified manifest file may be sent to the secondary user device(s) 310 by the gateway 308 or one or more other computing devices in the system 300. The gateway 308 may also measure network latencies and/or update the latency table based on various network latencies (e.g., processing, transmission and propagation delays), as previously described in connection with FIG. 3.

Figure 5A:
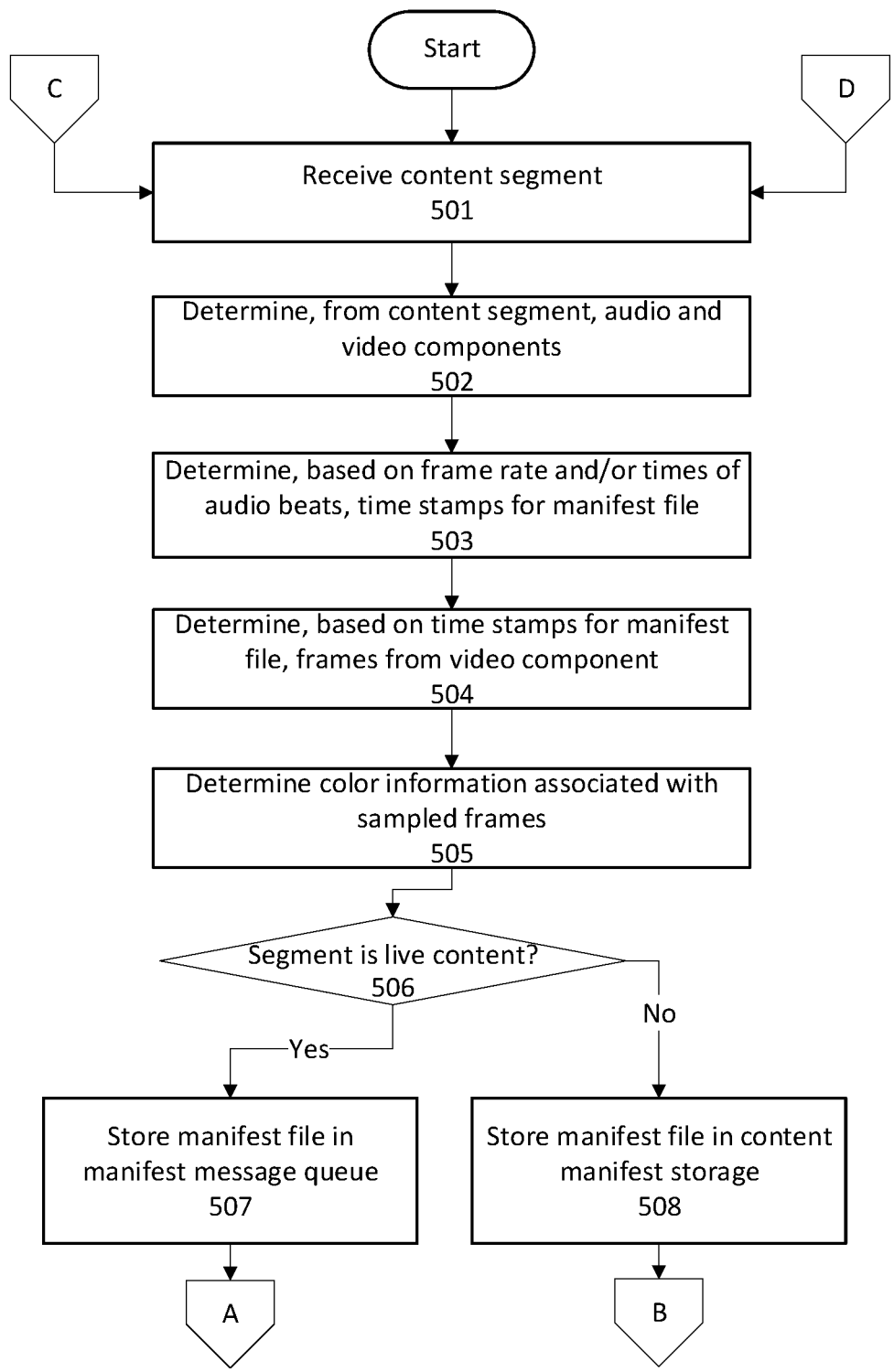
FIGS. 5A to 5C are flow charts showing an example method for synchronizing user devices outputting content segments and one or more visual effects associated with those content segments.
Figure 5B:
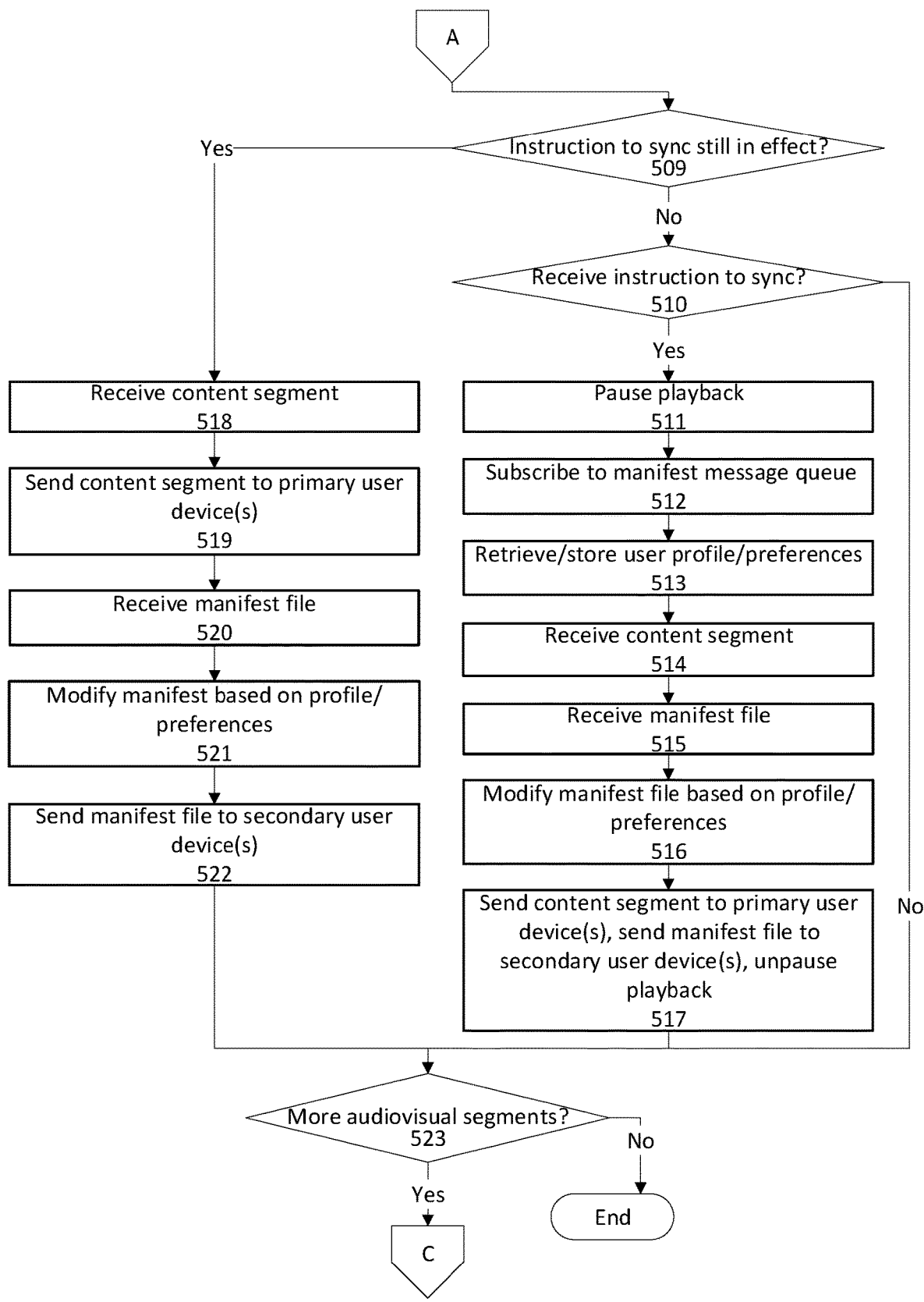
Figure 5C:
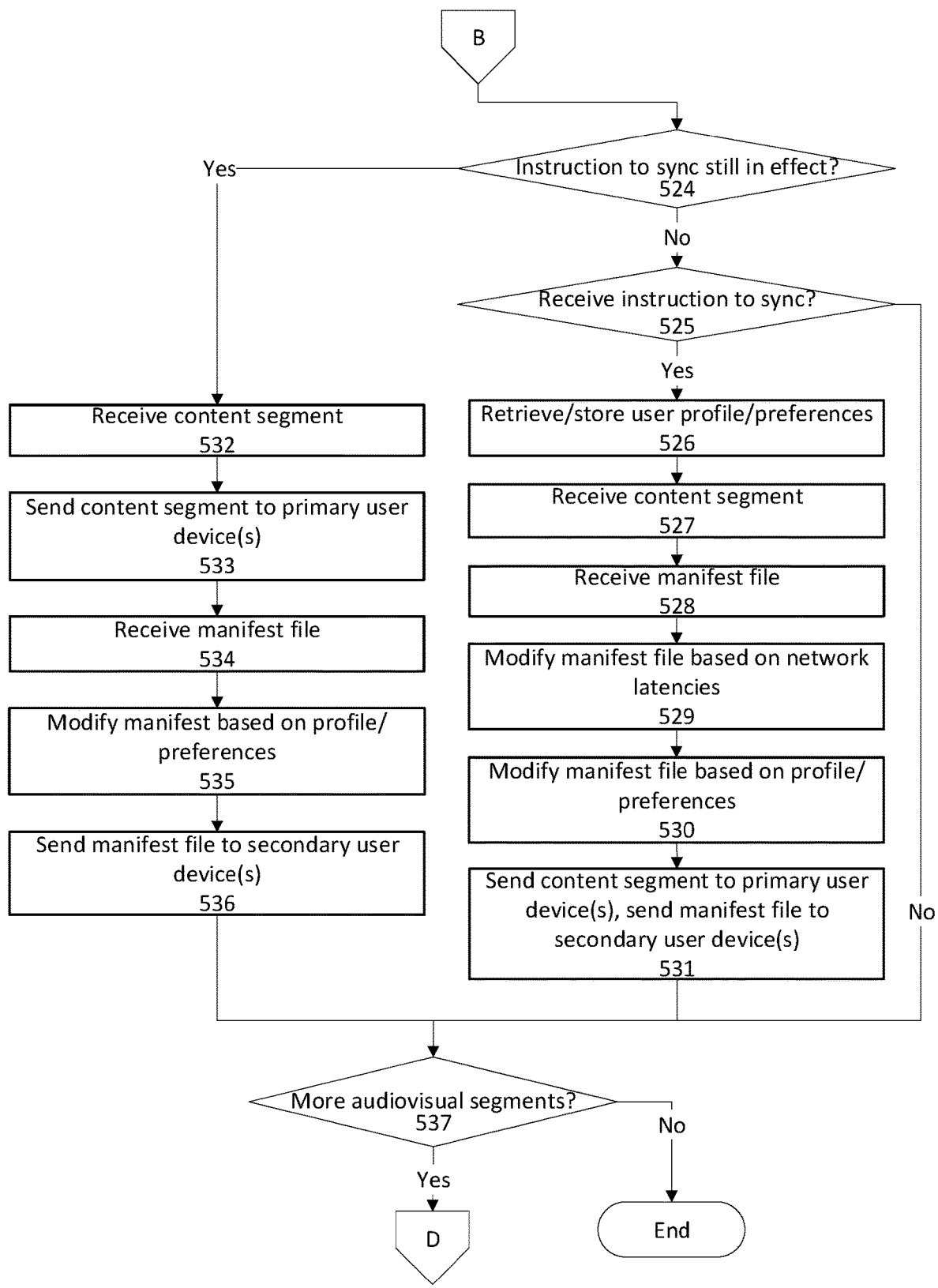

FIGS. 5A to 5C show a flow chart for an example method for synchronizing user devices outputting content segments and one or more visual effects associated with those content segments. This example method may be explained with reference to FIGS. 3 and 4. Although steps of the method are described below as performed by certain functional components from FIG. 3, some or all of the below-described steps could also or alternatively be performed by one or more computing devices corresponding to one or more other functional components from FIG. 3 and/or by one or more other computing devices. One or more steps shown in FIGS. 5A to 5C may be rearranged, omitted, or modified, and/or other steps added.

In FIG. 5A, at step 501, the audiovisual data processor 302 may receive a content segment (e.g., a segment of VOD content, live content, web-streaming content, etc.) from one or more of the content providers 301. The content segment may comprise a plurality of time stamps associated with the segment, as previously described. At step 502, audio and video components of the content segment may be determined. The audio component may comprise data for an audio track. The video component may comprise data for one or more video frames. The audio and video components may be stored by the audiovisual data processor 302 and/or a server (e.g., content server 106, app server 107, external network 209, etc.).

At step 503, a plurality of time values, for a manifest file associated with the content segment, may be determined by the audiovisual data processor 302. The audio component may be read via a beat tracking algorithm (e.g., a Java class named "BeatRootOnsetEventHandler") or beat detectors in music visualization software plugins (e.g., Windows Media Player, QuickTime Player, iTunes, etc.). The following scripts and/or codes (which are by way of example only, and are not limiting) may be used to read the audio component to return times of audio beats associated with the content segment:

import be.tarsos.dsp.beatroot.BeatRootOnsetEventHandler;
public BeatRootOnsetEventHandler 0;
public void handleOnset (double time, double salience);
public void trackB eats (OnsetHandler beatHandler);

The "BeatRootOnsetEventHandler" class may be used to return times of audio beats from the audio component. A beat tracking algorithm may be configured, using the above example scripts, to analyze the audio component and determine the times of audio beats associated with the content segment. The times of audio beats, which may be the time stamps associated with portions of the content segment during which the beats occur (e.g., the time stamps $TS_2$ and $TS_4$ in FIG. 4), may be stored by the audiovisual data processor 302 in a manifest file generated for the content segment.

Time values for the manifest file may also or alternatively be determined based on a regular sampling of the content segment. For example, a time stamp corresponding to every Nth frame (e.g., every 24th frame, as in the example of FIG. 4) may be determined, and those time stamps (the time stamps $TS_1$, $TS_3$, and $TS_5$ in FIG. 4) may be included in the manifest file. Such time stamps based on periodic sampling, together with corresponding color values, may be used to cause the secondary user device(s) 310 to continuously output color that corresponds to color being output for the content segment. Such continuously-output color may be provided as an alternative to or in conjunction with color output in synchronization with beats or other audio features.

At step 504, the audiovisual data processor 302 may determine, based on the time stamps determined in step 503, a plurality of corresponding frames from the video component (e.g., the frames 1, 16, 24, 35 and 48 in the example of FIG. 4). The frames determined in step 504 associated with the matched time stamps may be stored by the audiovisual data processor 302.

At step 505, the audiovisual data processor 302 may determine primary color information and/or other features for some or all of the frames determined in step 504. For example, average colors (e.g., RGB, HSB, HEX or CMYK colors) associated with the determined frames may be determined. For some or all of the determined frames, an average color associated with whole pixels within a single frame may be determined. Alternatively, an average color associated with a portion of a single frame may be determined (e.g., if that portion of the frame may be focused or emphasized). The information determined for each frame may be added to the manifest as corresponding color values for the time values, and/or may be further processed to obtain color values for inclusion in the manifest file. For example, to determine a color value corresponding to a time value for a beat (e.g., the time value $TS_2$ in the example of FIG. 4), the average color values of frames determined by regular sampling (e.g., the frames 1 and 24 in the example of FIG. 4) may be further averaged. Values based on that further average may be added to the manifest file as the color values corresponding to a time value for the beat. Color values corresponding to some or all of the time values in the manifest file may be determined and added to the manifest file. Other types of visual information such as, for example, logos, diagrams, icons, signs, texts, symbols or patterns, may also be indicated via the manifest file. Shown below is an example manifest file comprising, for example, time values (in $10^{-8}$ seconds) and corresponding HSB color values:

[ . . . {"timeLength":8.7333333E7,"hsb":{"hue":7411,"saturation":144,"brightness":148}}, {"timeLength": 8.8708333E7,"hsb":{"hue":7801,"saturation":123,"brightness":145}},{"ti meLength":9.0083333E7,"hsb":{"hue":14563,"saturation":16, "brightness":91}},{"timeL ength":9.1333333E7,"hsb":{"hue":15291,"saturation":14, "brightness":91}} . . . ]

At step 506, the audiovisual data processor 302 may determine whether the content segment is a segment of live content. As previously described in connection with FIG. 3, a content segment of live content may be sent to the manifest message queue 304 by the audiovisual data processor 302, and a content segment of live content may be sent to the content manifest storage 303 by the audiovisual data processor 302. To facilitate sending of the live content segment and/or its manifest file(s) to the gateway 308, the live content segment may be stored by the manifest message queue 304, the gateway 308 may be subscribed to the manifest message queue 304, and the gateway 308 may continuously receive the live content segment and/or its manifest file(s) from the manifest message queue 304. At step 506, the audiovisual data processor 302 may send an indication for the content segment of live content to the controller 305. Then the controller 305 may receive the indication from the audiovisual data processor 302 and, after step 506, manage, send or direct the content segment and/or its manifest file to one or more computing devices (e.g., the content manifest storage 303, the network manager 306, the gateway 308, the primary user device(s) 309, the secondary user device(s) 310, etc.). Alternatively, the audiovisual data processor 302 may send the content segment and its manifest file to the controller 305 and the controller 305 may determine whether the content segment is a segment of live content. If the content segment is a segment of live content (step 506: yes), the controller 305 may proceed to step 507. At step 507, the manifest file for the content segment, as previously described in connection with FIG. 3, may be stored by the manifest message queue 304 (e.g., the controller 305 may cause the manifest file to be stored in the manifest message queue). The manifest message queue 304 may comprise a lightweight buffer which temporarily stores the manifest file and may allow other physical components in the system 300 to connect to the manifest message queue 304 in order to send and/or receive the live content manifest file. The manifest file may be stored by the manifest message queue 304 until another component (e.g., the network manager 306 or the gateway 308) requests to subscribe to the manifest message queue 304 and/or otherwise retrieves the manifest file. The controller 305 may proceed to step 509 of FIG. 5B.

At step 509, the controller 305 may determine whether an instruction (e.g., a prior user instruction) to synchronize output by user devices has previously been processed and is still in effect. If such an instruction is not in effect (step 509: no), the controller 305 may proceed to step 510.

At step 510, the controller 305 may determine whether an instruction to synchronize user devices has been received. If an instruction has not been received (step 510: no), the controller 305 may proceed to step 523 (described below). If an instruction has been received (step 510: yes), the controller 305 may proceed to step 511.

At step 511, playback of the content comprising the content segment (e.g., via the primary user device(s) 309) may be paused to prepare for synchronization of the user devices. To pause the playback, the gateway 308 may, for example, continue to send the primary user device(s) 309 a frame (e.g., a frame preceding the content segment in the live content) with an overlay indicating playback is paused. The controller 305 may send a request to pause playback of the content to the gateway 308, via the network manager 306. The playback of the content may be paused until additional steps (e.g., steps 512 to 517 described below) have been performed in preparation for synchronized output, based on the manifest file and subsequent manifest files, of visual effects and the content segment and subsequent content segments.

At step 512, the controller 305 may send the indication for the content segment of live content (e.g., the content's title, index, identification, etc.) to the network manager 306. The network manager 306 may send to the gateway 308 an indication of a content topic associated with the content segment manifest file (and manifest files for subsequent content segments of the same content). The gateway 308, based on the content topic, may subscribe to the manifest message queue 304. The gateway 308 may subsequently receive, based on that subscription and from the manifest message queue 304, the manifest file for the content segment and subsequent manifest files for subsequent content segments.

At step 513, user profile and/or user preference data, for example, as previously described in connection with FIG. 3, may be retrieved from the profile database 307 and sent to the gateway 308 by the network manager 306 or one or more other computing devices in the system 300. The gateway 308 may store that data and use that data to modify manifest files for the content associated with the pending instruction to synchronize. At step 514, the gateway 308 may receive the content segment. At step 515, the gateway 308 may receive the manifest file generated for that segment (e.g., as described in connection with steps 501 through 505). In step 516, the gateway 308 may modify the manifest file based on the data received and stored in step 513. For example, a user may be a fan of a sports team and select a set of team colors (e.g., midnight green corresponding to PANTONE 316 C; HEX #004C54; RGB (0, 76, 84); or CMYK (100, 0, 30, 70), as previously described in connection with FIG. 3) for the user profile and/or user preference data. The gateway 308 may add or change the set of team colors in the manifest file at times of team commercials, intermissions, or cheering moments broadcast by the primary user device(s) 309. The set of team colors may also be turned on and off by the secondary user device(s) 310, based on time stamps in the adjusted manifest file. Other user-selected optical, graphic, and/or special effects may be added to the manifest file by the gateway 308 or one or more other computing devices in the system 300. For example, a user may configure the user profile and/or user preference data to cause a flashing light effect when the sports team succeeds a touchdown (e.g., notified by one or more of the content providers 301). Based on the user profile and/or user preference data, the gateway 308 may adjust color codes and time stamps within the manifest file to visualize a flashing light effect (e.g., a rapid change of colors or turning on/off one or more lights via the secondary user device(s) 310). Step 516 may be omitted, e.g., if no modifications based on the user profile and/or user preference data is desired.

At step 517, the gateway 308 may unpause playback of the content, may send the content segment to the primary user device(s) 309, and may send the manifest file to the secondary user device(s) 310. Also or alternatively, a request to unpause the playback of the segment of live content on the primary user device(s) 309 may be sent from the gateway 308 to the controller 305, via the network manager 306. The controller 305 may receive the request to unpause the playback. The controller 305 may cause the gateway 308 to unpause the playback, send the segment of live content to the primary user device(s) 309, and send the manifest file to the secondary user device(s) 310. The primary user device(s) 309, after receiving the content segment, may output the audio and video components of the content segment. The secondary user device(s) 310, after receiving the manifest file, may control lighting element(s) and/or other elements to produce visual effects based on time values in the manifest file and on color values (and/or other values) corresponding to those time values. Users may thereby experience an immersive experience of synchronized output of the user devices. For example, a primary user device 309 may show the live content (e.g., a Super Bowl halftime show) and a secondary user device(s) 310 may show average colors of what the smart TV is displaying and/or pulses to audio beats associated with the Super Bowl halftime show.

At step 523, the controller 305 may determine (e.g., based on data in the content segment, based on program guide or other data, and/or based on other information) whether one or more additional content segments are available for the content. If there are more segments (step 523: yes), the controller 305 may proceed to step 501 of FIG. 5A. At step 501, the home entertainment system 300 may receive the next content segment, generate a manifest file for that next content segment, etc. If there are no more content segments (step 523: no), the controller 305 may end the method.

Referring back to step 509, if an instruction to synchronize output by user devices is still in effect (step 509: yes), the controller 305 may proceed to step 518. At step 518, the gateway 308 may receive a next content segment (e.g., one or more additional content segments associated with the live content). At step 519, the gateway 308 may send the next content segment to the primary user device(s) 309. At step 520, the gateway 308 may receive the manifest file generated for that next segment (e.g., as described in connection with steps 501 through 505).

At step 521, the gateway 308 may modify the manifest file based on the user profile and/or user preference data previously received and stored in step 513 of a previous loop, where the controller 305 proceeded to step 510 through 517 (step 509: no). The gateway 308 may also or alternatively include time value adjustment based on net time delay and/or other delay (e.g., network delays if content segments are received from a source in the system 300 different from the manifest message queue 304 and a time difference between receipt of the content segments and receipt of associated manifest files is detected). Step 521 may be omitted if no modification based on the user profile and/or user preference data is desired. At step 522, the gateway 308 or one or more other computing devices in the system 300 may send the manifest file to the secondary user device(s) 310. The controller 305 may proceed to step 523.

Referring back to FIG. 5A, if content segment is not a segment of live content (step 506: no), the controller 305 may proceed to step 508. If the content segment is not a segment of live content, the content segment may be a segment of VOD content (or other type of content). The manifest file for the content segment of VOD content may be stored by the content manifest storage 303. The content segment and its manifest file may be retrieved by the controller 305 and from the content manifest storage 303, and the controller 305 may proceed to step 524 of FIG. 5C.

In FIG. 5C, at step 524, the controller 305 may determine whether an instruction (e.g., a prior user instruction) to synchronize output by user devices has previously been processed and is still in effect. If such an instruction is not in effect (step 524: no), the controller 305 may proceed to step 525.

At step 525, the controller 305 may determine whether an instruction to synchronize user devices has been received. If an instruction has not been received (step 525: no), the controller 305 may proceed to step 537 (described below). If an instruction has been received (step 525: yes), the controller 305 may cause, for example, the network manager 306 to perform step 526.

At step 526, user profile and/or user preference data, for example, as previously described in connection with FIG. 3 and step 513 of FIG. 5B, may be retrieved from the profile database 307 and sent to the gateway 308 by the network manager 306 or one or more other computing devices in the system 300. The gateway 308 may store that data and use that data to modify manifest files for the content segment. At step 527, the gateway 308 may receive the content segment. At step 528, the gateway 308 may receive the manifest file generated for that segment (e.g., as described in connection with steps 501 through 505).

At step 529, the gateway 308 may modify the manifest file based on net time delay (and/or other delays), as previously described in connection with FIG. 3. The gateway 308 or one or more computing devices in the system 300 may employ the latency table recording various network delays to adjust time values (e.g., time stamps) within the manifest file. For example, the gateway 308 or the network manager 306 may offset time stamps in the manifest file based on one or more net time delays caused by, for example, processing delay, transmission delay, propagation delay, etc. The latency table may be updated based on network delays associated with the system 300 and the user devices (e.g., primary user device(s) 309 and secondary user device(s) 310). If a user instruction to pause, fast-forward, or rewind the content segment is received, the latency table may be updated and the gateway 308, based on the updated latency table, may adjust the manifest file for that content segment. The adjusted manifest file may be sent to the secondary user device(s) 310 by the gateway 308.

At step 530, the gateway 308 may modify the manifest file based on the data received and stored in step 526. Step 530 may be omitted, e.g., if no modifications based on the user profile and/or user preference data is desired. At step 531, the gateway 308 may send the content segment to the primary user device(s) 309 and send the manifest file to the secondary user device(s) 310.

At step 537, the controller 305 may determine (e.g., based on data in the content segment, based on program guide or other data, and/or based on other information) whether one or more additional content segments are available for the content. If there are more segments (step 537: yes), the controller 305 may proceed to step 501 of FIG. 5A. At step 501, the home entertainment system 300 may receive the next content segment, generate a manifest file for that next content segment, etc. If there are no more content segments (step 537: no), the controller 305 may end the method.

Referring back to step 524, if an instruction to synchronize output by user devices is still in effect (step 524: yes), the controller 305 may cause, for example, the gateway 308 to perform step 532. At step 532, the gateway 308 may receive a next content segment (e.g., one or more additional content segments associated with the VOD content). At step 533, the gateway 308 may send the next content segment to the primary user device(s) 309. At step 534, the gateway 308 may receive the manifest file generated for that next segment (e.g., as described in connection with steps 501 through 505).

At step 535, the gateway 308 may modify the manifest file based on the user profile and/or user preference data previously received and stored in step 526 of a previous loop, where the controller 305 proceeded to step 525 through 531 (step 524: no). The gateway 308 may also or alternatively modify the manifest file based on net time delay (and/or other delays), as previously described in connection with step 529 of FIG. 5C. At step 536, the gateway 308 or one or more other computing devices in the system 300 may send the manifest file to the secondary user device(s) 310. The controller 305 may proceed to step 537.

The gateway 308 may also or alternatively send content segments and associated manifest files to the primary user device(s) 309, instead of sending the manifest files to the secondary user device(s) 310, for example, at step 517 of FIG. 5B and step 531 of FIG. 5C. The primary user device(s) 309 may receive the content segments and the manifest files from the gateway 308, process and/or adjust the manifest files, and forward the manifest files to the secondary user device(s) 310. The primary user device(s) 309 may manage or control the secondary user device(s) 310 via one or more manifest files associated with a content segment of live or VOD content.

The gateway 308 may also or alternatively send content segments and associated manifest files to the secondary user device(s) 310, instead of sending the content segments to the primary user device(s) 309, for example, at step 517 of FIG. 5B and step 531 of FIG. 5C. The secondary user device(s) 310 may receive the content segments and the manifest files from the gateway 308, process and/or adjust the manifest files, and forward the content segments to the primary user device(s) 309.

The gateway 308 may also or alternatively send content segments and associated manifest files to one or more other computing devices, different from the primary user device(s) 309 and the secondary user device(s) 310. The one or more other computing devices may receive the content segments and the manifest files from the gateway 308, process and/or adjust the manifest files, and forward the content segments to the primary user device(s) 309 and manifest files to the secondary user device(s) 310.

The audiovisual data processor 302 may also or alternatively generate a plurality of manifest files for a single content segment, with each of the manifest files comprising different time values/adjustments. For example, the manifest files may be separately modified or adjusted by the gateway 308 if each of the secondary user device(s) 310 receiving the manifest files incurs a different network latency (e.g., if one of the secondary user devices 310 has more latency than another secondary user device).

The gateway 308 may also or alternatively modify or adjust the manifest files based on individual user preferences (e.g., one user watching content in one room and another user watching same content in a different room). The gateway 308 may receive the manifest file for a content segment of that content, make necessary number of copies of the manifest file, modify each of the copies based on the individual user preferences, and send the modified copies to different secondary user device(s) 310 (e.g., located in different rooms).

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
sending, by a first computing device to a second computing device, content segments associated with a content item;
receiving a request to synchronize output, of visual effects from one or more third computing devices, with output of the content item via the second computing device;
pausing, based on receiving the request, sending of an additional content segment associated with the content item to the second computing device;
receiving, by the first computing device, a manifest file associated with the additional content segment, wherein the additional content segment comprises an audio component and a video component, and wherein the manifest file comprises data, for controlling the output of the visual effects by the one or more third computing devices, comprising:
a time value associated with one or more frames of the video component of the additional content segment, wherein the time value indicates a time associated with a beat in the audio component, and
color values, corresponding to the time value, based on the one or more frames of the video component; and sending, based on receiving the manifest file, the additional content segment to the second computing device and the manifest file to the one or more third computing devices.

2. The method of claim 1, wherein the color values comprise values indicating average red, green, and blue color values associated with pixels of the one or more frames of the video component.

3. The method of claim 1, further comprising:
modifying, based on one or more user preferences associated with the one or more third computing devices, the manifest file.

4. The method of claim 1, wherein the receiving the manifest file comprises receiving, based on subscription to a message queue associated with the additional content segment, the manifest file.

5. The method of claim 1, further comprising causing, based on the manifest file, adjustment of output of visual effects from the one or more third computing devices, wherein the visual effects are associated with the color values.

6. The method of claim 1, wherein the one or more third computing devices comprise at least one lighting device.

7. The method of claim 1, wherein the color values comprise values indicating average hue, brightness, and saturation values associated with pixels of the one or more frames of the video component.

8. The method of claim 1, further comprising sending, after pausing the sending of the additional content segment associated with the content item, an alternative segment comprising an overlay indicating the sending of the additional content segment is paused.

9. A computing device comprising:
one or more processors; and
memory storing instructions that, when executed by the one or more processors, configure the computing device to:
send, to a second computing device, content segments associated with a content item;
receive a request to synchronize output, of visual effects from one or more third computing devices, with output of the content item via the second computing device;
pause, based on receiving the request, sending of an additional content segment associated with the content item to the second computing device;
receive a manifest file associated with the additional content segment, wherein the additional content segment comprises an audio component and a video component, and wherein the manifest file comprises data, for controlling the output of the visual effects by the one or more third computing devices, comprising:
a time value associated with one or more frames of the video component of the additional content segment, wherein the time value indicates a time associated with a beat in the audio component, and
color values, corresponding to the time value, based on the one or more frames of the video component; and
send, based on receiving the manifest file, the additional content segment to the second computing device and the manifest file to the one or more third computing devices.

10. The computing device of claim 9, wherein the color values comprise values indicating average red, green, and blue color values associated with pixels of the one or more frames of the video component.

11. The computing device of claim 9, wherein the instructions, when executed by the one or more processors, further configure the computing device to:
modify, based on one or more user preferences associated with the one or more third computing devices, the manifest file.

12. The computing device of claim 9, wherein the instructions, when executed by the one or more processors, configure the computing device to receive the manifest file based on subscription to a message queue associated with the additional content segment.

13. The computing device of claim 9, wherein the instructions, when executed by the one or more processors, further configure the computing device to cause, based on the manifest file, adjustment of output of visual effects from the one or more third computing devices, wherein the visual effects are associated with the color values.

14. The computing device of claim 9, wherein the one or more third computing devices comprise at least one lighting device.

15. The computing device of claim 9, wherein the color values comprise values indicating average hue, brightness, and saturation values associated with pixels of the one or more frames of the video component.

16. The computing device of claim 9, wherein the instructions, when executed by the one or more processors, further configure the computing device to send, after pausing the sending of the additional content segment associated with the content item, an alternative segment comprising an overlay indicating the sending of the additional content segment is paused.

17. One or more non-transitory computer readable medium storing instructions that, when executed, cause:
sending, by a first computing device to a second computing device, content segments associated with a content item;
receiving a request to synchronize output, of visual effects from one or more third computing devices, with output of the content item via the second computing device;
pausing, based on receiving the request, sending of an additional content segment associated with the content item to the second computing device;
receiving, by the first computing device, a manifest file associated with the additional content segment, wherein the additional content segment comprises an audio component and a video component, and wherein the manifest file comprises data, for controlling the output of the visual effects by the one or more third computing devices, comprising:
a time value associated with one or more frames of the video component of the additional content segment, wherein the time value indicates a time associated with a beat in the audio component, and
color values, corresponding to the time value, based on the one or more frames of the video component; and
sending, based on receiving the manifest file, the additional content segment to the second computing device and the manifest file to the one or more third computing devices.

18. The one or more non-transitory computer readable medium of claim 17, wherein the color values comprise values indicating average red, green, and blue color values associated with pixels of the one or more frames of the video component.

19. The one or more non-transitory computer readable medium of claim 17, wherein the instructions, when executed, further cause:
   modifying, based on one or more user preferences associated with the one or more third computing devices, the manifest file.

20. The one or more non-transitory computer readable medium of claim 17, wherein the receiving the manifest file comprises receiving, based on subscription to a message queue associated with the additional content segment, the manifest file.

21. The one or more non-transitory computer readable medium of claim 17, wherein the instructions, when executed, further cause:
   causing, based on the manifest file, adjustment of output of visual effects from the one or more third computing devices, wherein the visual effects are associated with the color values.

22. The one or more non-transitory computer readable medium of claim 17, wherein the one or more third computing devices comprise at least one lighting device.

23. The one or more non-transitory computer readable medium of claim 17, wherein the color values comprise values indicating average hue, brightness, and saturation values associated with pixels of the one or more frames of the video component.

24. The one or more non-transitory computer readable medium of claim 17, wherein the instructions, when executed, further cause sending, after pausing the sending of the additional content segment associated with the content item, an alternative segment comprising an overlay indicating the sending of the additional content segment is paused.

\* \* \* \* \*